US008364859B2

(12) United States Patent
Sato

(10) Patent No.: US 8,364,859 B2
(45) Date of Patent: Jan. 29, 2013

(54) STORAGE DEVICE, BOARD, LIQUID CONTAINER AND SYSTEM

(75) Inventor: Jun Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/031,155

(22) Filed: Feb. 18, 2011

(65) Prior Publication Data

US 2011/0276726 A1 Nov. 10, 2011

(30) Foreign Application Priority Data

Feb. 22, 2010 (JP) ................................ 2010-035898

(51) Int. Cl.
*G06F 3/00* (2006.01)

(52) U.S. Cl. .......................................... 710/17; 702/120

(58) Field of Classification Search .................... 710/17; 702/120
See application file for complete search history.

(56) References Cited

U.S. PATENT DOCUMENTS

| | | | | |
|---|---|---|---|---|
| 6,749,281 | B2 | 6/2004 | Asauchi | |
| 6,994,415 | B2 * | 2/2006 | Asauchi et al. | 347/19 |
| 7,321,436 | B2 * | 1/2008 | Asauchi | 358/1.15 |
| 2002/0016893 | A1 | 2/2002 | Asauchi | |
| 2002/0191041 | A1 | 12/2002 | Asauchi | |
| 2006/0139692 | A1 | 6/2006 | Asauchi | |
| 2007/0030508 | A1 | 2/2007 | Asauchi | |
| 2007/0126770 | A1 * | 6/2007 | Asauchi | 347/19 |
| 2007/0279690 | A1 | 12/2007 | Asauchi | |
| 2008/0106757 | A1 | 5/2008 | Asauchi | |
| 2009/0262161 | A1 * | 10/2009 | Nishihara | 347/19 |
| 2010/0021954 | A1 * | 1/2010 | Deshayes et al. | 435/29 |

FOREIGN PATENT DOCUMENTS

| | | | |
|---|---|---|---|
| JP | 2517540 | Y2 | 9/1996 |
| JP | 2002-014870 | A | 1/2002 |
| JP | 2002-370383 | A | 12/2002 |
| JP | 2006-127407 | A | 5/2006 |
| JP | 2009-274438 | A | 11/2009 |

OTHER PUBLICATIONS

U.S. Appl. No. 13/031,137, filed Feb. 18, 2011, entitled "Storage Device, Substrate, Liquid Container, Host Device, and System", 51 pages.
U.S. Appl. No. 13/031,145, filed Feb. 18, 2011, entitled "Storage Device, Substrate, Liquid Container, Host Device, and System", 62 pages.
U.S. Appl. No. 13/031,152, filed Feb. 18, 2011, entitled "Memory Device, Board, Liquid Container, Host Device, and System", 70 pages.

* cited by examiner

*Primary Examiner* — Elias Mamo
(74) *Attorney, Agent, or Firm* — Kilpatrick Townsend & Stockton LLP

(57) ABSTRACT

A storage device, a board, a liquid container, a system and the like are disclosed, which are capable of efficiently detecting a connection to a host device without an increase in the number of existing terminals. A storage device 100 includes: a storage section 130; a storage controller 120 that controls access to the storage section 130; a controller 110 that performs a communication process with the host device; a data terminal SDA; a reset terminal XRST; and a clock terminal SCK. The controller 110 determines that an operational mode is a normal communication/connection detection mode when a voltage level change of the reset terminal XRST indicates a change in a reset/reset-disabled state during a time period for the clock terminal SCK has specific voltage level(s).

8 Claims, 16 Drawing Sheets

(A)

| MODE | XRST | SCK | SDA | SDET | SCOM |
|---|---|---|---|---|---|
| CONNECTION DETECTION MODE | ↑ | H | L | H | L |
| NORMAL COMMUNICATION MODE | ↑ | L | L | L | H |

FIG. 10

| ID INFORMATION | bit2 | bit1 | bit0 | CLOCK CYCLE |
|---|---|---|---|---|
| ID=0 | 0 | 0 | 0 | NOT USED |
| ID=1 | 0 | 0 | 1 | T1 |
| ID=2 | 0 | 1 | 0 | T2 |
| ID=3 | 0 | 1 | 1 | T3 |
| ID=4 | 1 | 0 | 0 | T4 |
| ID=5 | 1 | 0 | 1 | T5 |
| ID=6 | 1 | 1 | 0 | T6 |
| ID=7 | 1 | 1 | 1 | T7 |

FIG. 11

| | | T1 | T2 | T3 | T4 | T5 | T6 | T7 |
|---|---|---|---|---|---|---|---|---|
| SINGLE-COLOR TYPE | ID=1 | RESPONSE | Hi-Z | Hi-Z | Hi-Z | Hi-Z | Hi-Z | Hi-Z |
| | ID=2 | Hi-Z | RESPONSE | Hi-Z | Hi-Z | Hi-Z | Hi-Z | Hi-Z |
| | ID=3 | Hi-Z | Hi-Z | RESPONSE | Hi-Z | Hi-Z | Hi-Z | Hi-Z |
| | ID=4 | Hi-Z | Hi-Z | Hi-Z | RESPONSE | Hi-Z | Hi-Z | Hi-Z |
| INTEGRATED FOUR-COLOR TYPE | ID=7 | RESPONSE | RESPONSE | RESPONSE | RESPONSE | Hi-Z | Hi-Z | Hi-Z |
| BLACK AND INTEGRATED FOUR-COLOR TYPE | BLACK ID=1 | RESPONSE | Hi-Z | Hi-Z | Hi-Z | Hi-Z | Hi-Z | Hi-Z |
| | COLOR ID=6 | Hi-Z | RESPONSE | RESPONSE | RESPONSE | Hi-Z | Hi-Z | Hi-Z |

STORAGE DEVICE, BOARD, LIQUID CONTAINER AND SYSTEM

CROSS REFERENCES TO RELATED APPLICATIONS

The present invention contains subject matter related to Japanese Patent Application No. 2010-035898 filed in the Japan Patent Office on Feb. 22, 2010, the entire contents of which are incorporated herein by reference.

BACKGROUND OF THE INVENTION

1. Technical Field

The present invention relates to a storage device, a board, a liquid container, a system and the like.

2. Background Art

For a printer that is used while an ink cartridge (liquid container) is attached to the printer, it is necessary to detect whether or not the ink cartridge is attached in order to prevent a printing process from being performed while the ink cartridge is not attached.

For this challenge, Patent Document 1 discloses a method for detecting whether or not an electrical connection is established using a detection terminal attached to the printer and a detection terminal attached to the ink cartridge and thereby detecting whether or not the ink cartridge is attached. In this method, however, there is a problem that the number of terminals is increased.

In addition, for example, Patent Document 2 discloses a method for causing a terminal for detecting a remaining amount of ink to detect whether or not the ink cartridge is attached. In this method, however, there is a problem that the number of terminals cannot be reduced even when the remaining amount of the ink is detected by another method.

[Citation List]

[Patent Document 1] JP-A-2002-14870

[Patent Document 2] JP-A-2009-274438

SUMMARY OF THE INVENTION

Accordingly, the object of the present invention is to provide a storage device, a board, a liquid container, a system and the like, which do not cause an increase in the number of terminals and can efficiently detect a connection.

An aspect of the invention relates to a storage device that includes: a storage section; a storage controller that controls access to the storage section; a controller that performs a communication process with a host device; a data terminal; a reset terminal; and a clock terminal, wherein the controller determines that an operational mode is a normal communication mode when a voltage level of the reset terminal is changed from a voltage level indicating a reset state to a voltage level indicating a reset-disabled state during a time period for which a voltage level of the clock terminal is a first voltage level, and wherein the controller determines that the operational mode is a connection detection mode when the voltage level of the reset terminal is changed from the voltage level indicating the reset state to the voltage level indicating the reset-disabled state during a time period for which the voltage level of the clock terminal is a second voltage level.

According to the aspect of the invention, the controller can determine whether the operational mode is the normal communication mode or the connection detection mode on the basis of the voltage level of the clock terminal and the voltage level of the reset terminal. Thus, a terminal for detecting a connection is not necessary, and the number of terminals can be reduced. As a result, an efficient detection of the connection of the storage device and the like can be performed.

In addition, according to the aspect of the invention, a reset signal that corresponds to the storage device among first to n-th (n is an integer of two or more) reset signals output from the host device may be input to the reset terminal.

In this case, the storage device determines whether the operational mode is the normal communication mode or the connection detection mode on the basis of the reset signal input to the reset terminal of the interested storage device. When the operational mode is the connection detection mode, the storage device can output a response signal to the host device. As a result, an efficient detection of the connection of the storage device and the like can be performed.

In addition, according to the aspect of the invention, the host device may be electrically connected to first to n-th (n is an integer of two or more) storage devices including the storage device through a bus, and a reset signal that is output from the host device may be input to the reset terminal through the bus.

In this case, the storage device can determine whether the operational mode is the normal communication mode or the connection detection mode on the basis of the reset signal. When the operational mode is the connection detection mode, the storage device can output the response signal to the host device. As a result, an efficient detection of the connection of the storage device and the like can be performed.

In addition, according to the aspect of the invention, when the controller determines that the operational mode is the connection detection mode, the controller may output a response signal to the host device through the data terminal in accordance with a clock after the level of the clock terminal is changed from the second voltage level to the first voltage level, while the response signal indicates that the storage device is connected.

In this case, since the controller can output, to the host device through the data terminal, the response signal indicating that the storage device is connected, the terminal for detecting the connection is not necessary, and the number of terminals can be reduced. As a result, an efficient detection of the connection of the storage device and the like can be performed.

According to the aspect of the invention, a clock that includes first to n-th (n is an integer of two or more) clock cycles may be input to the clock terminal, and when the controller determines that the operational mode is the connection detection mode, the controller may output, to the host device through the data terminal, the response signal indicating that the storage device is connected, for an m-th (m is at least one of integers satisfying $1 \leqq m \leqq n$) clock cycle that corresponds to information on the ID of the storage device among the first to n-th clock cycles after the voltage level of the clock terminal is changed from the second voltage level to the first voltage level.

In this case, since the storage device can output the response signal for the clock cycle corresponding to the information on the ID of the storage device, a time for the detection can be reduced. As a result, an efficient detection of the connection of the storage device and the like can be performed.

In addition, according to the aspect of the invention, when the controller determines that the operational mode is the normal communication mode, the controller may receive information output from the host device through the data terminal in accordance with the clock after the voltage level of the clock terminal is changed from the first voltage level to the second voltage level.

In this case, since the controller can receive the information output from the host device in the normal communication mode, the controller can receive data or the like, which is to be written and has been output from the host device, and the controller can perform a process of writing the data in the storage device and the like.

In addition, according to the aspect of the invention, the controller may receive a command as the information output from the host device, analyze the received command, and receive data from the host device on the basis of the result of the analysis or perform a process of transmitting data to the host device on the basis of the result of the analysis.

In this case, the controller can receive the data or the like, which is to be written and has been output from the host device, on the basis of the command output from the host device, and the controller can perform the process of writing the data or the like in the storage device on the basis of the command output from the host device. In addition, the controller can read data from the storage section and perform the process of transmitting the data to the host device on the basis of the command output from the host device, and the like.

In addition, according to the aspect of the invention, when the voltage level of the reset terminal is changed from the voltage level indicating the reset-disabled state to the voltage level indicating the reset state after the controller determines that the operational mode is the connection detection mode, the controller may perform a process of terminating the connection detection mode.

In this case, the controller can terminate the connection detection mode and change the operational mode to the normal communication mode.

Another aspect of the invention relates to a board that includes any of the storage devices described above.

Another aspect of the invention relates to a liquid container that includes any of the storage devices described above.

According to the other aspect of the invention, since it is possible to efficiently detect whether or not the storage device that is included in the liquid container is appropriately connected, it is possible to efficiently detect whether or not the liquid container is appropriately attached.

Another aspect of the invention relates to a system that includes any of the storage devices described above and the host device.

According to the other aspect of the invention, since the host device can efficiently detect whether or not the storage device is appropriately connected, an improvement of reliability of the system and the like can be achieved.

BRIEF DESCRIPTION OF THE DRAWINGS

FIG. 10 is a diagram showing an example of corresponding relationships between ID information and clock cycles.

FIG. 11 is a diagram showing another example of the corresponding relationships between the ID information and the clock cycles.

DESCRIPTION OF EMBODIMENTS

A preferred embodiment of the invention is described below in detail. The embodiment described below does not unduly limit the contents of the invention described in the claims, and not all configurations described in the embodiment are necessarily essential as the solution of the invention.

1. System

Figure 1:
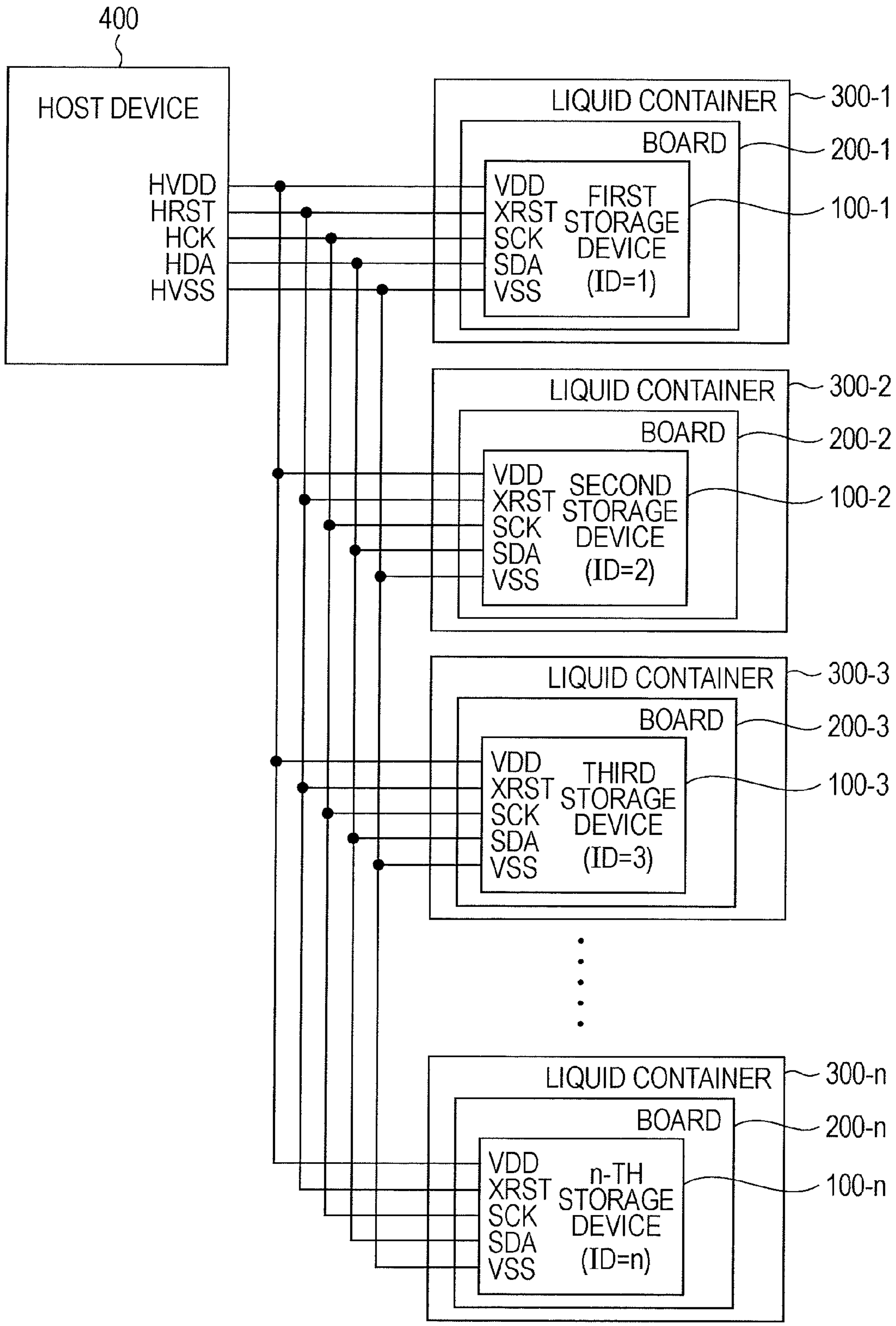
FIG. 1 is a diagram showing a first example of the configuration of a system.

FIG. 1 shows a first example of the configuration of a system according to the present embodiment. The system according to the present embodiment, which has the configuration shown in the first example, includes: first to n-th (n is an integer of two or more) storage devices 100-1 to **100-*n*; a number n of boards 200-1 to 200-*n* on which the storage devices are mounted; a number n of liquid containers 300-1 to 300-*n* provided with the boards; and a host device 400. The system according to the present embodiment is not limited to the configuration shown in FIG. 1**. The system may be variously modified. A part of the constituent elements of the system may be omitted or replaced with another constituent element. Another constituent element may be added to the system.

The first to n-th storage devices 100-1 to **100-*n* each have a reset terminal XRST, a clock terminal SCK, a data terminal SDA, a first power supply terminal VSS and a second power supply terminal VDD. As described later, the number n of storage devices 100-1 to 100-*n*** each include a storage section (for example, nonvolatile memory or the like). The storage sections each store identification (ID) information (for example, ID=1, ID=2, ID=3 or the like) in order to identify the number n of liquid containers (for example, ink cartridges or the like). The IDs that vary depending on the types (such as colors) of liquids stored in the liquid containers are provided.

The first to n-th storage devices 100-1 to **100-*n* are electrically connected to the host device 400 through a bus. The bus includes reset signal lines, clock signal lines and data signal lines. Communication is performed between the storage devices 100-1 to 100-*n* and the host device 400** through the bus. In addition, the bus may include first and second power supply lines to supply first power and second power.

The storage devices each have a normal communication mode (normal operational mode) and a connection detection mode as operational modes. The normal communication mode is a mode in which the storage device transmits data stored in the storage section to the host device and updates the data stored in the storage section on the basis of data received from the host device. The connection detection mode is an operational mode of each of the storage devices when the host device detects whether or not the host device is connected to the storage device.

In the connection detection mode, the storage devices each output, to the host device 400 through the data terminal SDA, a response signal that corresponds to a clock cycle of a clock supplied from the host device 400 and indicates that the storage device is connected.

The clock cycle is not a physical cycle of the clock signal supplied from the host device 400 and is a logical cycle to be used to control a communication process between the host device 400 and the storage device 100. Thus, one clock cycle may be equal to one physical cycle of the clock signal. In addition, one clock cycle may be equal to two physical cycles of the clock signal.

The host device 400 includes first to k-th (k is an integer of two or more) host-side terminals. Specifically, the host device 400 includes a host-side reset terminal HRST, a host-side clock terminal HCK, a host-side data terminal HDA, a first host-side power supply terminal HVSS and a second host-side power supply terminal HVDD. The host device 400 is a printer body or the like, for example. As described later, the host device 400 can determine, on the basis of the response signals supplied from the storage devices 100-1 to **100-*n*, whether or not the storage devices are connected or whether or not the liquid containers 300-1 to 300-*n*** are attached.

Figure 2:
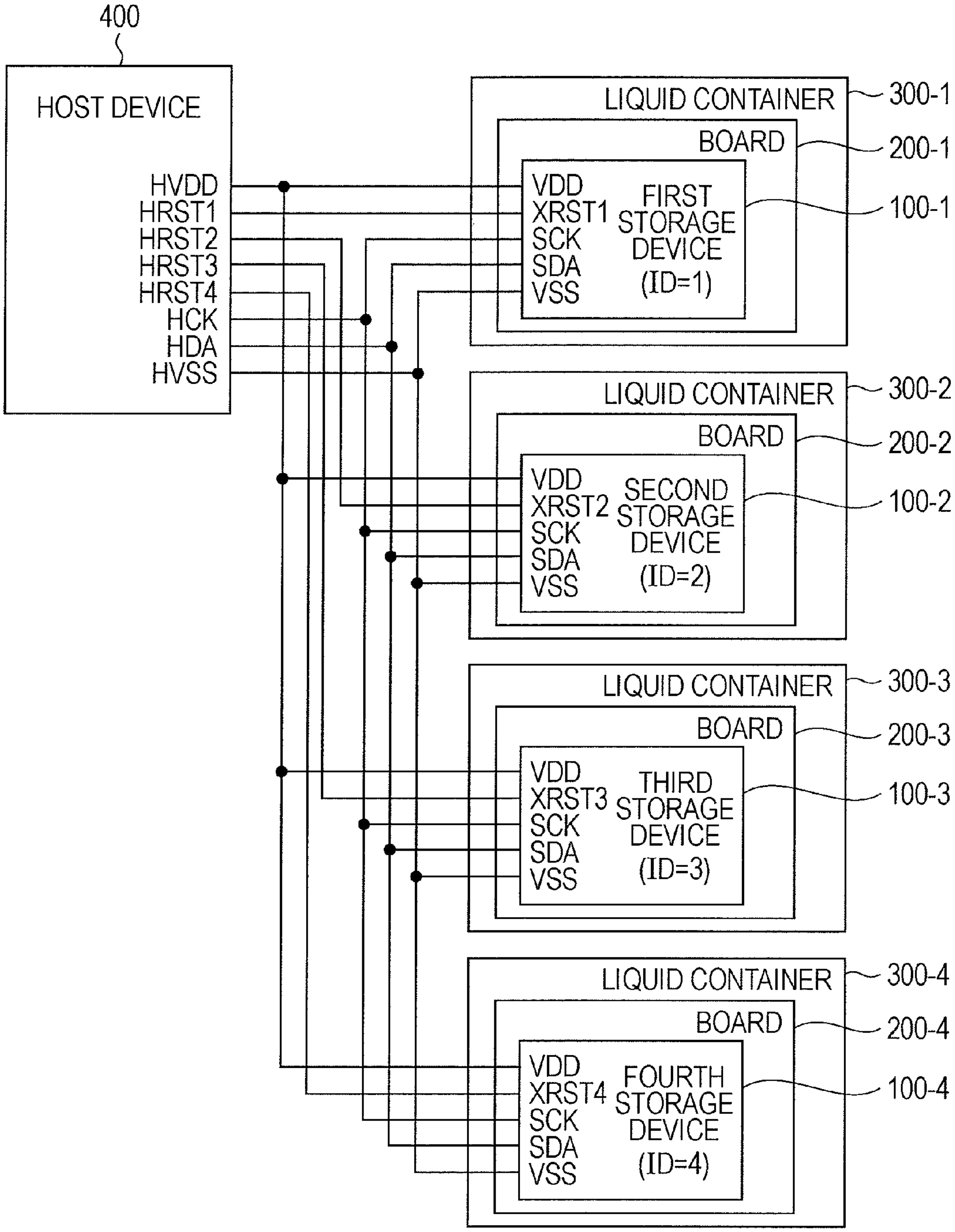
FIG. 2 is a diagram showing a second example of the configuration of the system.

FIG. 2 shows a second example of the configuration of the system according to the present embodiment. In the second configuration example, the reset signal lines are not included in the bus and are provided for the storage devices, respectively. This feature is different from the first configuration example.

Specifically, as shown in FIG. 2, the host device 400 includes first to fourth host-side reset terminals HRST1 to HRST4 (first to n-th (n is an integer of two or more) host-side reset terminals in the broad sense) and outputs first to fourth reset signals (first to n-th reset signals in the broad sense), for example. Then, the first to fourth reset signals are input to reset terminals XRST1 to XRST4 of the first to fourth storage devices 100-1 to 100-4 (first to n-th storage devices in the broad sense). In other words, among the first to n-th reset signals output from the host device 400, reset signals that correspond to the storage devices are input to the reset terminals.

As described above, in the system according to the present embodiment, the storage devices 100 can each output, to the host device 400 through the data terminal SDA, the response signal indicating that the storage device is connected. Thus, a terminal for detecting whether or not the liquid container 300 is attached is not necessary, and the number of terminals can be reduced.

2. Storage Device

Figure 3:
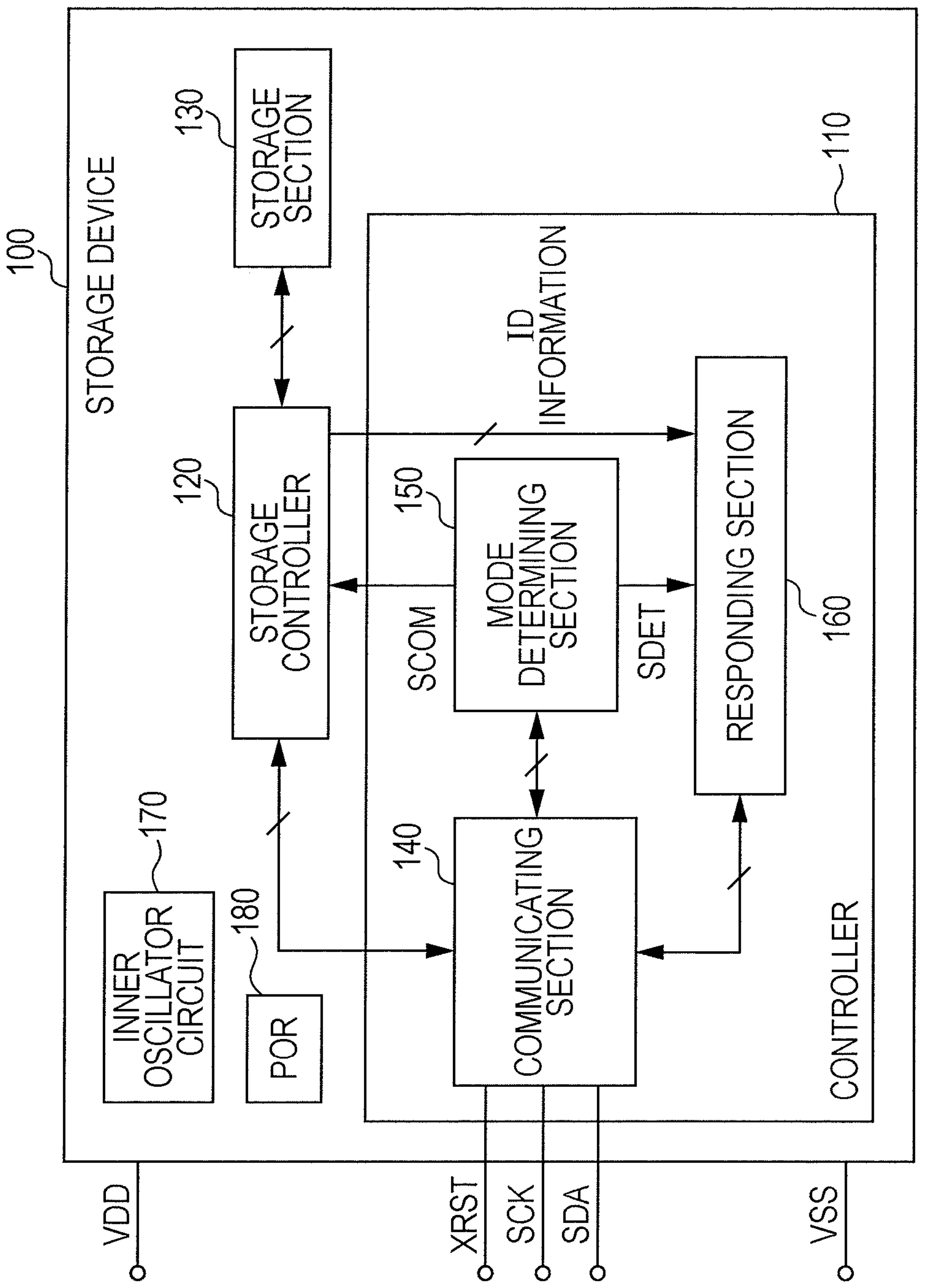
FIG. 3 is a diagram showing an example of a basic configuration of a storage device.

FIG. 3 shows an example of a basic configuration of the storage device 100. The storage device 100 according to the present embodiment includes a controller 110, a storage controller 120, a storage section 130, the data terminal SDA, the reset terminal XRST, and the clock terminal SCK. The storage device 100 according to the present embodiment is not limited to the configuration shown in FIG. 3. The storage device 100 according to the present embodiment may be variously modified. A part of the constituent elements of the storage device 100 may be omitted or replaced with another constituent element. Another constituent element may be added to the storage device 100 according to the present embodiment.

The storage section 130 stores the ID information written at the time of manufacturing, manufacturing information, and information transmitted from the host device 400 and written. For example, when an ink cartridge is used, the storage section 130 stores information on a manufacturing date, information on the color of ink, and the like, as the manufacturing information, and stores information on a remaining amount of the ink, and the like, as the information transmitted from the host device 400 and written. The storage section 130 is constituted by a nonvolatile memory such as a ferroelectric random access memory (FERAM) or a flash memory, for example.

It is not necessary to store the ID information identifying the storage device 100 in the storage section 130 constituted by a nonvolatile memory or the like. For example, the ID information can be stored using a fuse element or output by a logic circuit.

The storage controller 120 controls access to the storage device 130 in the normal communication mode (normal operational mode) and the connection detection mode.

The controller 110 includes a communicating section 140, a mode determining section 150 and a responding section 160. The communicating section 140 performs communication with the host device 400. The mode determining section 150 determines whether the operational mode is the normal communication mode (normal operational mode) or the connection detection mode. When the mode determining section 150 determines that the operational mode is the normal communication mode, the mode determining section 150 sets, to an active level, a control signal SCOM to be transmitted to the storage controller 120. When the mode determining section 150 determines that the operational mode is the connection detection signal, the mode determining section 150 sets, to an active level, a control signal SDET to be transmitted to the responding section 160.

In the normal communication mode, the communicating section 140 determines whether or not ID information transmitted from the host device 400 matches the information on the ID of the interested storage device. In addition, in the normal communication mode, the communicating section 140 analyzes a received command (write command, read command or the like).

The normal communication mode (normal operational mode) is an operational mode in which data communication is performed to transfer data on a remaining amount of ink or the like between the host device 400 and the storage device 100.

The connection detection mode is an operational mode in which whether or not the storage device 100 is connected is detected.

When the operational mode is determined to be the connection detection mode, the responding section 160 instructs the communicating section 140 to output a response signal indicating that the storage device is connected. In the first example (shown in FIG. 1) of the configuration of the system, when the control signal SDET transmitted from the mode determining section 150 is at the active level, the responding section 160 instructs, on the basis of the ID information read from the storage section 130 through the storage controller 120, the communicating section 140 to output the response signal for a clock cycle corresponding to the ID information.

In the second example (shown in FIG. 2) of the configuration of the system, when the control signal SDET that is transmitted from the mode determining section 150 is at the active level, the responding section 160 instructs the communicating section 140 to output the response signal in accordance with the clock. In the second configuration example, since the host device 400 can specify a storage device of which the operational mode is set to the connection detection mode by the reset signal, it is not necessary to read the ID information from the storage section 130.

An inner oscillator circuit 170 generates an inner clock of the storage device 100 and supplies the generated inner clock to the controller 110, the storage controller 120, the storage section 130 and the like.

A power-on reset (POR) circuit 180 performs a power-on reset process on the basis of a second power supply voltage VDD. Specifically, the power-on reset circuit 180 sets the storage device 100 to a reset state until power is supplied. When the power is supplied, the power-on reset circuit 180 disables the reset state of the storage device 100. Specifically, when the power is supplied from the host device 400 and the difference between the second power supply voltage VDD and a first power supply voltage VSS is equal to or larger than a threshold voltage (predetermined voltage), the power-on reset circuit 180 sets a power-on reset signal POROUT to an H level (high potential level, second voltage level in the broad sense).

As described above, the storage device according to the present embodiment can output, to the host device through the data terminal SDA, the response signal indicating that the storage device is connected. Thus, it is not necessary to provide a terminal for detecting whether or not the liquid container is attached, and the number of terminals can be reduced. In addition, when the storage section has the ID information stored therein, only the ID information needs to be read from the storage section in the connection detection mode. Thus, by prohibiting (masking) access to other data, it is possible to prevent stored contents from being unintentionally damaged. Furthermore, since it is possible to detect whether or not a single storage device is connected (or a single liquid container is attached) for a single clock cycle, a time period for the detection can be reduced.

In the second example (shown in FIG. 2) of the configuration of the system, since it is not necessary to read the ID information in the connection detection mode, it is possible to prevent the stored contents from being damaged and reduce the time period for the detection.

On the other hand, in the normal communication mode (normal operational mode), by detecting a communication timeout error, it is possible to detect whether or not the liquid container is attached. However, since the connection is established using the bus, it takes time until a timeout error occurs and whereby it takes time until whether or not the liquid container is attached is detected. When the time period for the detection is long, an error may occur during communication. As a result, it may be determined that the liquid container is not attached, although the liquid container is actually attached.

Figure 4:
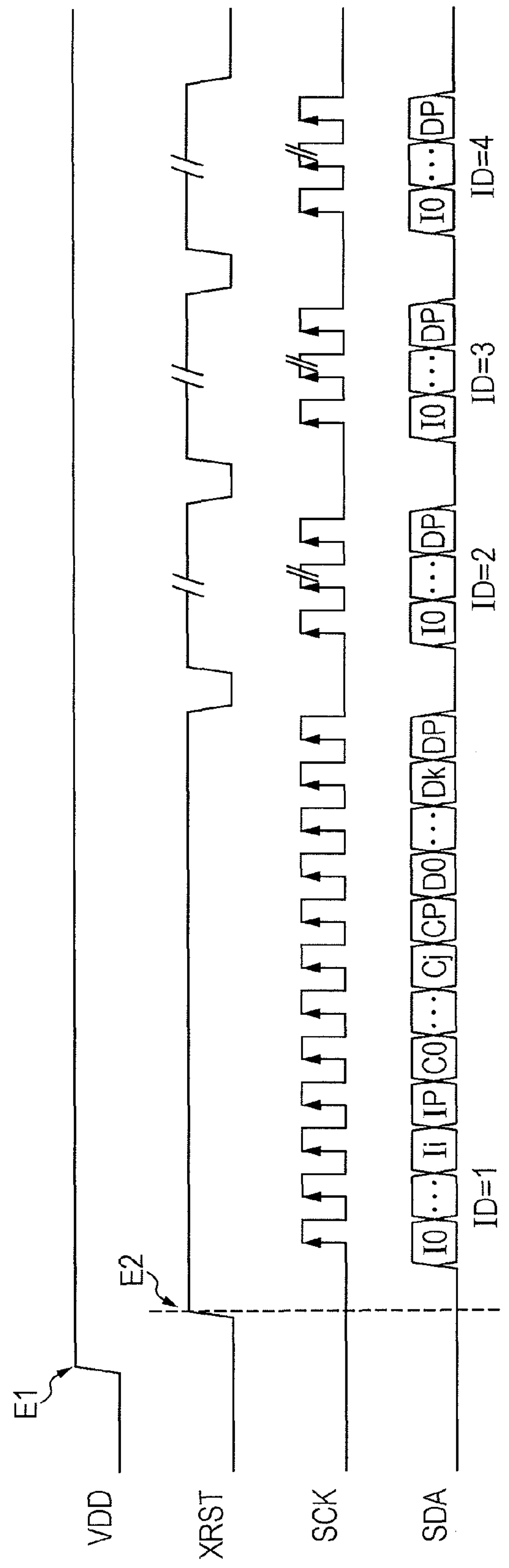
FIG. 4 is a diagram showing an example of a timing chart in a normal communication mode of the storage device.

FIG. 4 shows an example of a timing chart in the normal communication mode of the storage device 100. FIG. 4 shows a timing chart when data to be written is transmitted from the host device 400 to the storage devices 100-1 to 100-4 in the first example (shown in FIG. 1) of the configuration of the system.

First, the host device 400 starts supplying a power supply voltage to each of the storage devices through the first and second power supply lines. When the voltage of the second power supply terminal VDD of the storage device reaches a predetermined voltage (based on a potential supplied from the first power supply line) (E1 of FIG. 4), a power-on reset is disabled by the power-on reset (POR) circuit 180.

Next, the host device 400 sets the level (voltage level of the reset terminal XRST in the broad sense) of the reset signal from an L level (voltage level indicating the reset state in the broad sense) to an H level (voltage level indicating the reset-disabled state) (E2 of FIG. 4).

The mode determining section 150 (controller 110 in the broad sense) determines that the operational mode is the normal communication mode (normal operational mode) when the voltage level of the reset terminal XRST is changed from the voltage level (L level) indicating the reset state to the voltage level (H level) indicating the reset-disabled state (E2 of FIG. 4) during a time period for which the voltage level of the clock terminal SCK is a first level (L level).

Subsequently, the host device 400 supplies a clock to the clock terminal SCK and transmits the ID information, a write command and data to the first storage device (ID=1) on the basis of the clock.

When the controller 110 determines that the operational mode is the normal operational mode, the controller 110 receives the information output from the host device 400 through the data terminal SDA in accordance with the clock after the voltage level of the clock terminal SCK is changed from the L level (first voltage level in the broad sense) to the H level (second voltage in the broad sense). More specifically, the controller 110 receives a command as the information output from the host device 400, analyzes the received command, receives the data from the host device 400 on the basis of the result of the analysis or performs a process of transmitting data to the host device 400 on the basis of the result of the analysis. The host device 400 can transmit the ID information in order to specify the storage device before transmitting the command.

As shown in FIG. 4, the ID information is constituted by i+1 bits of I0 to Ii (i is a natural number), for example. A parity bit IP is added to the ID information. In addition, the write command is constituted by j+1 bits of C0 to Cj (j is a natural number), for example. A parity bit CP is added to the write command. In addition, the data is constituted by k+1 bits of D0 to Dk, for example. A parity bit DP is added to the data. The parity bits IP, CP and DP are bits added for parity check so that the number of bits of 1 is always an odd number or even number.

The communicating section 140 of the first storage device (ID=1) detects that the received ID information (ID=1) matches the ID information stored in the first storage device. In addition, the communicating section 140 of the first storage device (ID=1) detects that the received command is the write command. Then, the communication section receives the data and outputs the received data to the storage controller 120. The storage controller 120 writes the data in the storage section 130.

On the other hand, the second to fourth storage devices (IDs=2 to 4) each detect that the received ID information (ID=1) does not match the ID information stored in the storage device and do not receive the command and the data.

When the host device 400 completes the transmission of the data to the first storage device (ID=1), the host device 400 changes the voltage level of the reset terminal XRST from the H level to the L level and sets the voltage level of the reset terminal XRST to the H level again. Then, the host device 400 transmits the ID information, the write command and data to the second storage device (ID=2).

The communicating section 140 of the second storage device (ID=2) detects that the received ID information (ID=2) matches the ID information stored in the second storage device. In addition, the communicating section 140 of the second storage device (ID=2) detects that the received command is the write command. Then, the communicating section 140 receives the data and outputs the received data to the storage controller 120. The storage controller 120 writes the data in the storage section 130. In this case, the other storage devices each detect that the received ID information (ID=2) does not match the ID information stored in the storage device and do not receive the command and the data.

In the same manner, the host device 400 sequentially transmits the ID information, the write command and data to the third and fourth storage devices (IDs=3, 4).

In the second example (shown in FIG. 2) of the configuration of the system, the host device 400 can specify one of the storage devices and set the specified storage device to the normal communication mode. For example, in order to transmit data to be written to the first storage device, the host device 400 sets the voltage level of the reset terminal XRST of the first storage device from the L level to the H level. Thus, the host device 400 can transmit the write command and the data to be written to the first storage device. In this case, since the storage device that is a destination of the data can be specified by the reset signal, it is not necessary to transmit the ID information.

In this manner, when the operational mode is the normal communication mode, the host device 400 can transmit data to be written to each of the first to fourth storage devices 100-1 to 100-4 and the data can be written in the storage sections 130 of the first to fourth storage devices. In a similar manner, the host device 400 can receive read data from the storage sections 130 of the storage devices.

Figure 5:
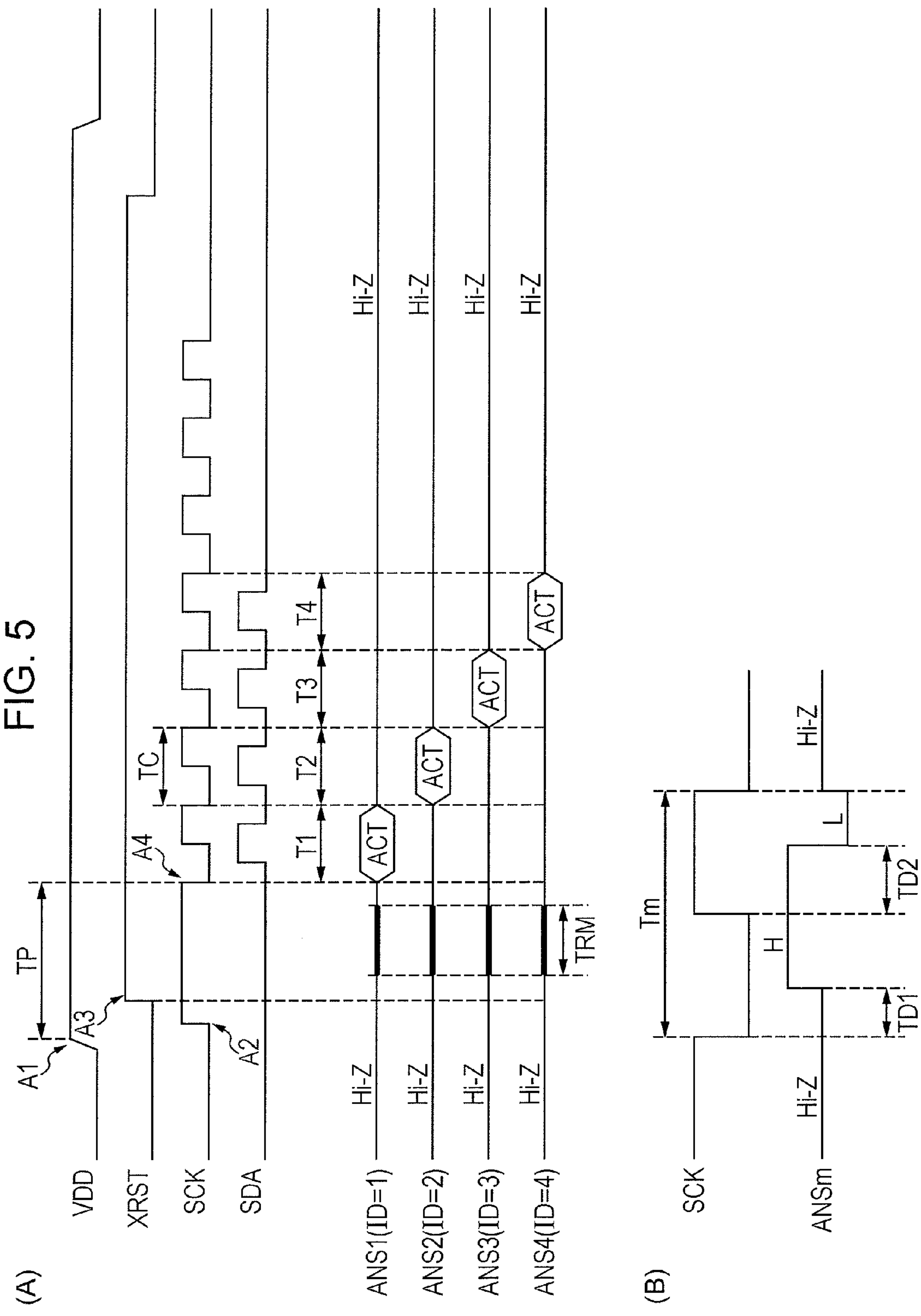
FIGS. 5A and 5B are diagrams showing a first example of a timing chart in a connection detection mode of the storage device.

FIGS. 5(A) and 5(B) show a first example of a timing chart in the connection detection mode of the storage device 100. This first example is based on the first example of the configuration of the system shown in FIG. 1. FIG. 5(A) shows timing charts of the second power supply voltage VDD, the reset signal (signal to be input to the reset terminal XRST in the broad sense), the clock signal (signal to be input to the clock terminal SCK in the broad sense), the data signal (signal to be input to the data terminal SDA in the broad sense) and response signals ANS1 to ANS4. In addition, FIG. 5(B) shows a detailed timing chart for a time period for which a response signal ANSm (m is at least one of integers satisfying $1 \leqq m \leqq n$) is in an active state ACT.

With reference to FIG. 5(A), operations of the storage device 100 are described. First, the second power supply voltage VDD rises (A1 of FIG. 5(A)). When the voltage VDD reaches a predetermined voltage, the power-on reset (POR) circuit 180 sets the power-on reset signal POROUT (not shown) to the H level (high potential level, second voltage level in the broad sense) so that the reset state is disabled.

Next, the level (voltage level of the clock terminal SCK in the broad sense) of the clock signal is changed from the L level (low potential level, first voltage level in the broad sense) to the H level (A2 of FIG. 5(A)). Then, the level (voltage level of the reset terminal XRST in the broad sense) of the reset signal is changed from the L level (voltage level indicating the reset state in the broad sense) to the H level (voltage level indicating the reset-disabled state in the broad sense) (A3 of FIG. 5(A)).

The mode determining section 150 (controller 110 in the broad sense) determines that the operational mode is the connection detection mode when the voltage level of the reset terminal XRST is changed from the voltage level (L level) indicating the reset state to the voltage level (H level) indicating the reset-disabled state during a time period for which the voltage level of the clock terminal SCK is the second voltage level (H level) (A3 of FIG. 5(A)).

Next, the voltage level of the clock terminal SCK is changed from the H level to the L level (A4 of FIG. 5(A)). The time when the voltage level of the clock terminal SCK is changed from the H level to the L level is the start time of a first clock cycle T1. Specifically, the responding section 160 determines that the time when the voltage level of the clock terminal SCK is changed from the second voltage level (H level) to the first voltage level (L level) after the voltage level of the clock terminal SCK is changed from the first voltage level (L level) to the second voltage level (H level) after the power supply is the start time of the first clock cycle T1.

The controller 110 outputs the response signal ANSm to the host device 400 through the data terminal SDA for an m-th (m is at least one of integers satisfying $1 \leqq m \leqq n$) clock cycle that corresponds to the information on the ID of the interested storage device among first to n-th (n is an integer of two or more) clock cycles of the clock to be input to the clock terminal SCK.

When the controller 110 determines that the operational mode is the connection detection mode, the controller 110 outputs the response signal ANSm (indicating that the interested storage device is connected) to the host device 400 through the data terminal SDA in accordance with the clock after the voltage level of the clock terminal SCK is changed from the second voltage level (H level) to the first voltage level (L level).

In the timing chart shown in FIG. 5(A), a single clock cycle is equal to a single physical cycle of the clock signal, but is not limited to this. For example, a single clock cycle may be equal to two physical cycles of the clock signal, for example.

Specifically, as shown in FIG. 5(A), the storage device 100-1 that has the ID information indicating 1 outputs the response signal ANS1 for the first clock cycle T1. The storage device 100-2 that has the ID information indicating 2 outputs the response signal ANS2 for a second clock cycle T2. In the same manner, the response signals ANS3 and ANS4 are output. After the operational mode is determined to be the connection detection mode, the information on the IDs of the storage devices are read from the storage sections 130 of the storage devices 100 for an ID information reading time period TRM that starts before the start time of the first clock cycle T1.

When the voltage level of the reset terminal XRST is changed from the voltage level (H level) indicating the reset-disabled state to the voltage level (L level) indicating the reset state after the controller 110 determines that the operational mode is the connection detection mode, the controller 110 performs a process of terminating the connection detection mode.

When a time period from the time (A1 of FIG. 5(A)) of supplying the power to the start time (A4 of FIG. 5(A)) of the first clock cycle T1 is indicated by TP, and each of the clock cycles of the clock to be input to the clock terminal SCK is indicated by TC, TP>TC. Specifically, the responding section 160 determines that the time when the voltage level of the clock terminal SCK is changed from the second voltage level (H level) to the first voltage level (L level) after a time that is longer than the cycle TC elapses after the power supply is the start time of the first clock cycle.

Thus, the following time period can be ensured: a time period from the time of supplying the power to the time when the ID information is read from the storage section 130. Specifically, during the time period, the power is supplied, the reset state is disabled by the power-on reset circuit 180 after the power supply, circuits of the storage device 100 then start operating, the mode determining section 150 then determines that the operational mode is the connection detection mode, and the ID information is then read from the storage section 130.

FIG. 5(B) shows the detailed timing chart for the time period for which the response signal ANSm is in the active state ACT. During the m-th clock cycle Tm, the response signal ANSm is changed from a high impedance state (Hi-Z) to an H level, then changed from the H level to an L level, and then returned to the high impedance state (Hi-Z). When a first delay time TD1 elapses after the start time (time of falling of the SCK) of the m-th clock cycle, the response signal ANSm is changed from the high impedance state (Hi-Z) to the H level. In addition, when a second delay time TD2 elapses after rising of the SCK, the response signal ANSm is changed from the H level to the L level. Thus, when two response signals are output for two chronologically adjacent clock cycles (for example, the second and third clock cycles), respectively, interference of the two response signal can be prevented by providing the first and second delay times TD1 and TD2.

Figure 6:
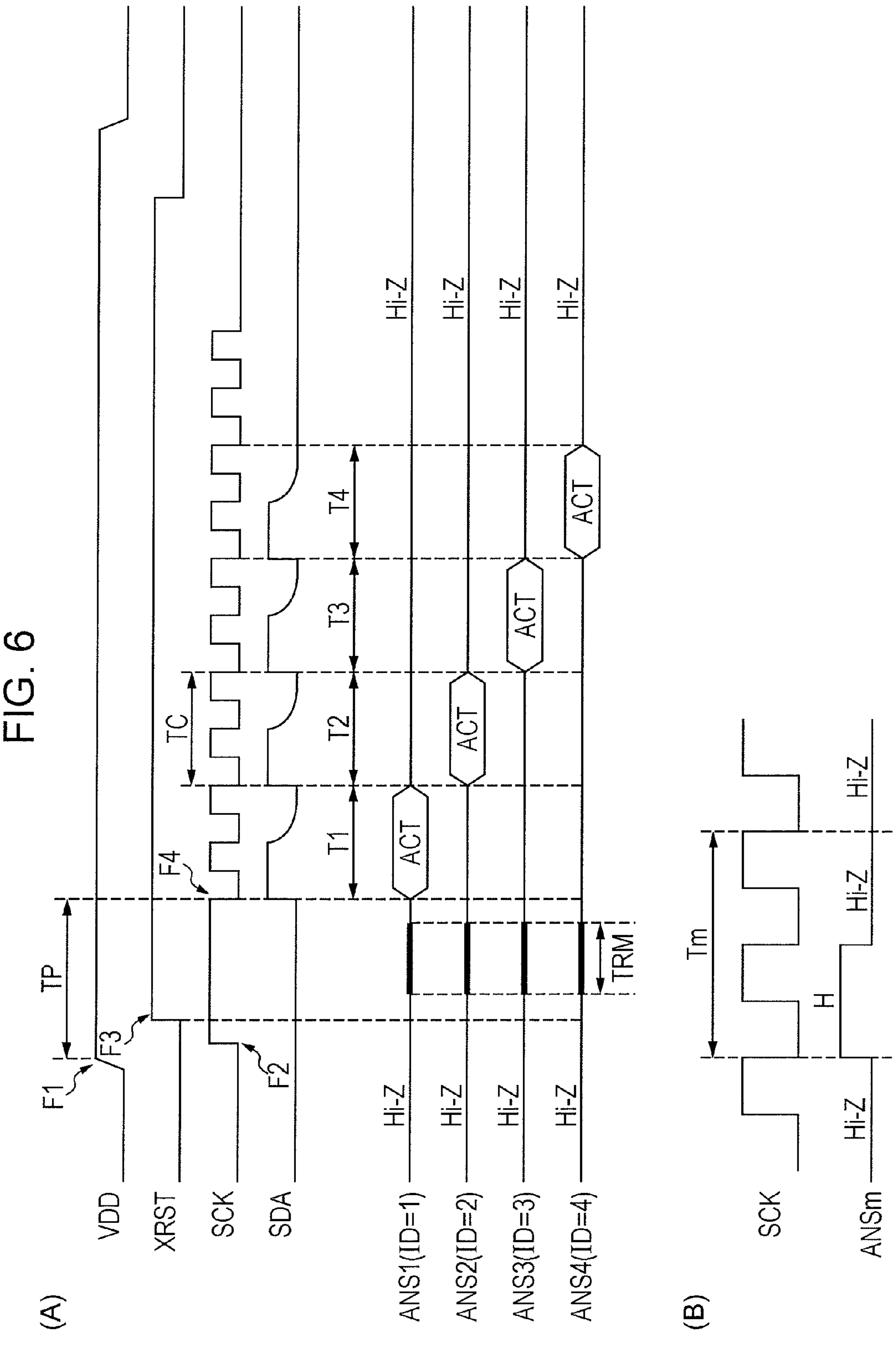
FIGS. 6A and 6B are diagrams showing a second example of the timing chart in the connection detection mode of the storage device.

FIGS. 6(A) and 6(B) show a second example of the timing chart in the connection detection mode of the storage device 100. This second example is based on the first example of the configuration of the system shown in FIG. 1. FIG. 6(A) shows timing charts of the second power supply voltage VDD, the reset signal (signal to be input to the reset terminal XRST in the broad sense), the clock signal (signal to be input to the clock terminal SCK in the broad sense), the data signal (signal to be input to the data terminal SDA in the broad sense) and response signals ANS1 to ANS4. In addition, FIG. 6(B) shows a detailed timing chart for a time period for which the response signal ANSm is in the active state ACT. Although the timing charts shown in FIGS. 6(A) and 6(B) are the same as the timing charts shown in FIG. 5(A) for the determination of the mode, the waveforms of the response signals shown in FIGS. 6(A) and 6(B) are different from the waveforms of the response signals shown in FIG. 5(A).

First, the second power supply voltage VDD rises (F1 of FIG. 6(A)). When the voltage VDD reaches a predetermined voltage, the power-on reset (POR) circuit 180 sets the power-on reset signal POROUT (not shown) to the H level so that the reset state is disabled.

Next, the level (voltage level of the clock terminal SCK in the broad sense) of the clock signal is changed from the L level to the H level (F2 of FIG. 6(A)). Then, the level (voltage level of the reset terminal XRST in the broad sense) of the reset signal is changed from the L level to the H level (F3 of FIG. 6(A)).

The mode determining section 150 determines that the operational mode is the connection detection mode when the voltage level of the reset terminal XRST is changed from the voltage level (L level) indicating the reset state to the voltage level (H level) indicating the reset-disabled state (F3 of FIG. 6(A)) during a time period for which the voltage level of the clock terminal SCK is the second voltage level (H level).

Next, the voltage level of the clock terminal SCK is changed from the H level to the L level (F4 of FIG. 6(A)). The time when the voltage level of the clock terminal SCK is changed from the H level to the L level is the start time of the first clock cycle T1. Specifically, the responding section 160 determines that the time when the voltage level of the clock terminal SCK is changed from the second voltage level (H level) to the first voltage level (L level) after the voltage level of the clock terminal SCK is changed from the first voltage level (L level) to the second voltage level (H level) after the power supply is the start time of the first clock cycle T1.

The controller 110 outputs the response signal ANSm to the host device 400 through the data terminal SDA for the m-th clock cycle that corresponds to the information on the ID of the interested storage device among the first to n-th clock cycles of the clock to be input to the clock terminal SCK.

In the timing chart shown in FIG. 6(A), two physical cycles of the clock signal is defined as a single clock cycle of the clock signal. For example, the first to fourth clock cycles T1 to T4 are each equal to two physical cycles of the clock signal.

As shown in FIG. 6(A), the storage device 100-1 that has the ID information indicating 1 outputs the response signal ANS1 for the first clock cycle T1. Then, the storage device 100-2 that has the ID information indicating 2 outputs the response signal ANS2 for the second clock cycle T2. In the same manner, the response signals ANS3 and ANS4 are output. After the operational mode is determined to be the connection detection mode, the information on the IDs of the storage devices is read from the storage sections 130 of the storage devices for the ID information reading time period TRM that starts before the start time of the first clock cycle.

In the same manner as FIG. 5(A), when a time period from the time (F1 of FIG. 6(A)) of supplying the power to the start time (F4 of FIG. 6(A)) of the first clock cycle T1 is indicated by TP, and each of the clock cycles of the clock to be input to the clock terminal SCK is indicated by TC, TP>TC.

FIG. 6(B) shows the detailed timing chart for the time period for which the response signal ANSm is in the active state ACT. The controller 110 sets the voltage level of the data terminal SDA to the second voltage level (H level) for a first time period of the m-th clock cycle. Then, the response signal ANSm is output by setting the data terminal SDA to the high impedance state Hi-Z for a second time period that starts after the first time period of the m-th clock cycle Tm. Thus, interference of two response signals can be prevented by setting the data terminal SDA to the high impedance state Hi-Z for the second time period of the clock cycle when the response signal is output for the next clock cycle.

A pull-down resistor is provided between the data terminal HDA and first power supply terminal HVSS of the host device 400. Thus, when the data terminal SDA is set to the high impedance state Hi-Z for the second time period of the clock cycle, the voltage level of the data terminal SDA is gradually reduced from the H level to the L level. As a result, the signal with a level that is set to the H level for the first time period of each of the clock cycles T1 to T4 corresponding to the first to fourth storage devices and gradually reduced to the L level for the second time period of each of the clock cycles T1 to T4 corresponding to the first to fourth storage devices is output as shown in FIG. 6(A).

Figure 7:
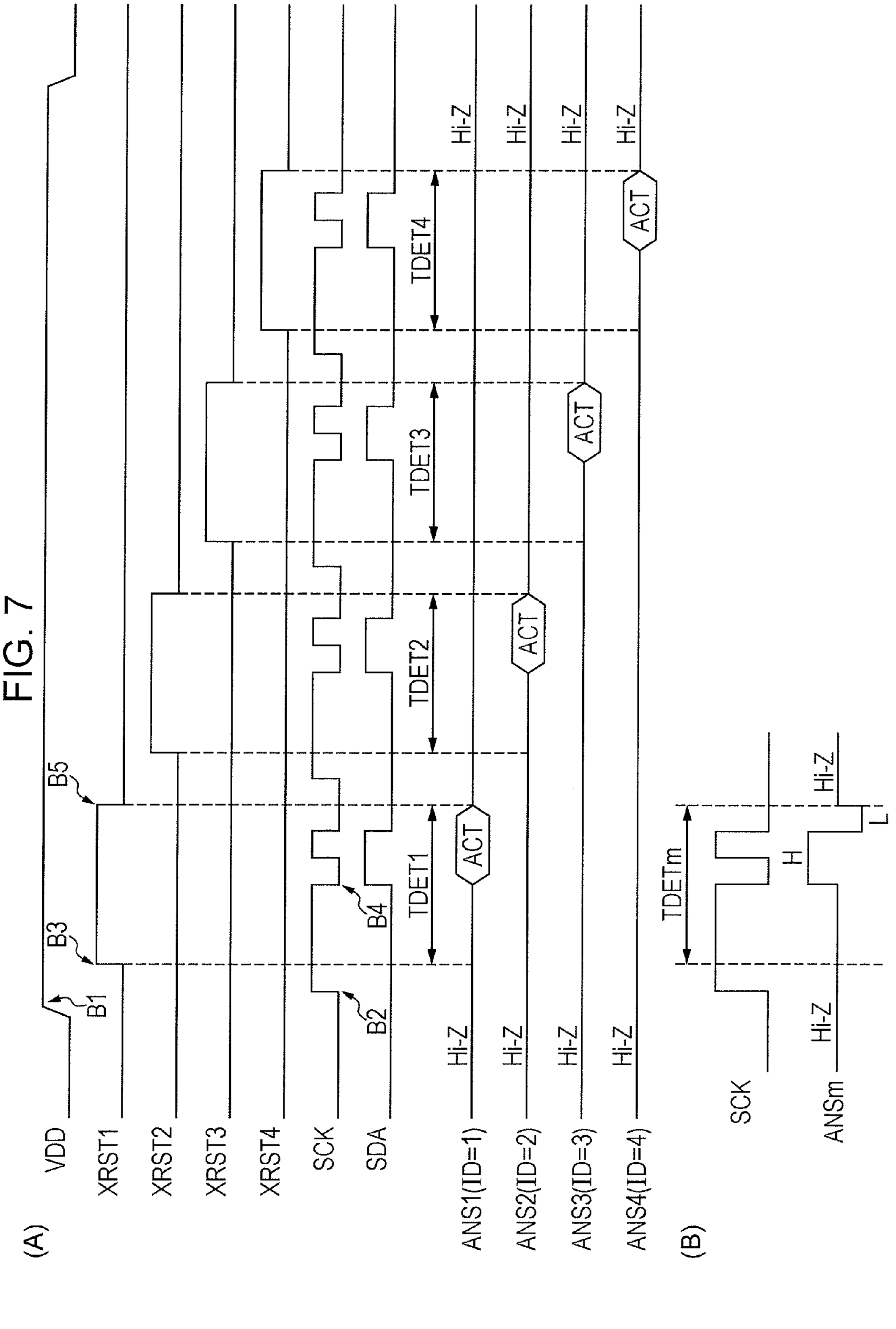
FIGS. 7A and 7B are diagrams showing a third example of the timing chart in the connection detection mode of the storage device.

FIGS. 7(A) and 7(B) show a third example of the timing chart in the connection detection mode of the storage device 100. The third example is based on the second example of the configuration of the system shown in FIG. 2. FIG. 7(A) shows timing charts of the second power supply voltage VDD, first to fourth reset signals to be input to the first to fourth storage devices, the clock signal, the data signal and the response signals ANS1 to ANS4. FIG. 7(B) shows a detailed timing chart for a time period for which the response signal ANSm (m is an integer satisfying $1 \leqq m \leqq 4$) is in the active state ACT.

Operations of the storage device 100 are described with reference to FIG. 7(A). First, the second power supply voltage VDD rises (B1 of FIG. 7(A)). When the voltage VDD reaches a predetermined voltage, the power-on reset (POR) circuit 180 set the power-on reset signal POROUT (not shown) to the H level so that the reset state is disabled.

Next, the level (voltage level of the clock terminal SCK) of the clock signal is changed from the L level to the H level (B2 of FIG. 7(A)). Then, the level (voltage level of the reset terminal XRST1 of the first storage device) of the first reset signal is changed from the L level (voltage level indicating the reset state) to the H level (voltage level indicating the reset-disabled state) (B3 of FIG. 7(A)).

The mode determining section 150 (controller 110 in the broad sense) of the first storage device 100-1 determines that the operational mode is the connection detection mode when the voltage level of the reset terminal XRST1 is changed from the voltage level (L level) indicating the reset state to the voltage level (H level) indicating the reset-disabled state during a time period for which the voltage level of the clock terminal SCK is the second voltage level (H level) (B3 of FIG. 7(A)).

Next, the voltage level of the clock terminal SCK is changed from the H level to the L level (B4 of FIG. 7(A)). At this time, the controller 110 of the first storage device 100-1 sets the response signal ANS1 to the active state ACT. Specifically, the controller 110 of the first storage device 100-1 outputs the response signal ANS1 to the host voltage 400 through the data terminal SDA in accordance with the clock after the voltage level of the clock terminal SCK is changed from the H level to the L level.

After the response signal ANS1 is output, the level of the first reset signal is changed from the H level (voltage level indicating the reset-disabled state) to the L level (voltage level indicating the reset state) (B5 of FIG. 7(A)). At this time, the controller 110 of the first storage device 100-1 performs the process of terminating the connection detection mode.

Next, the level (voltage level of the clock terminal SCK) of the clock signal is changed from the L level to the H level again. Then, the level (voltage level of the reset terminal XRST2 of the second storage device) of the second reset signal is changed from the L level (voltage level indicating the reset state) to the H level (voltage level indicating the reset-disabled state).

The mode determining section (controller 110 in the broad sense) of the second storage device 100-2 determines that the operational mode is the connection detection mode when the voltage level of the reset terminal XRST2 is changed from the voltage level (L level) indicating the reset state to the voltage level (H level) indicating the reset-disabled state during a time period for which the voltage level of the clock terminal SCK is the second voltage level (H level).

Next, the voltage level of the clock terminal SCK is changed from the H level to the L level. At this time, the controller 110 of the second storage device 100-2 sets the response signal ANS2 to the active state ACT. Specifically, the controller 110 of the second storage device 100-2 outputs the response signal ANS2 to the host device 400 through the data terminal SDA in accordance with the clock after the voltage level of the clock terminal SCK is changed from the H level to the L level.

After the response signal ANS2 is output, the level of the second reset signal is changed from the H level (voltage level indicating the reset-disabled state) to the L level (voltage level indicating the reset state). At this time, the controller 110 of the second storage device 100-2 performs the process of terminating the connection detection mode.

In the third example, a time period TDET2 for detecting the connection of the second storage device 100-2 is provided after a time period TDET1 for detecting the connection of the first storage device 100-1, and time periods TDET3 and TDET4 for detecting the connections of the third and fourth storage devices 100-3 and 100-4 are sequentially provided.

However, it is not necessary to sequentially provide the time periods TDET1 to TDET4 for detecting the connections as shown in FIG. 7(A). The order of the detections of the connections is arbitrary. For example, the time period for detecting the connections may be started from the time period TDET4 and ended at the time period TDET 1. Alternatively, the connection of only any of the first to fourth storage devices 100-1 to 100-4 may be detected.

FIG. 7(B) shows the detailed timing chart of the response signal ANSm. The controller 110 of the m-th storage device **100-*m*** changes the voltage level of the data terminal SDA from the high impedance state (Hi-Z) to the H level and then changes the voltage level of the data terminal SDA from the H level to the L level during an m-th time period TDETm for detecting the connection, and then sets the voltage level of the data terminal SDA to the high impedance state (Hi-Z) again. By setting the voltage level of the data terminal SDA to the high impedance state (Hi-Z) after the time period for detecting the connection, it is possible to prevent interference with the response signal output for the next time period for detecting the connection.

The waveform of the response signal ANSm is not limited to the waveform shown in FIG. 7(B). Various waveforms can be used as the waveform of the response signal ANSm. For example, the voltage level of the data terminal SDA may be changed from the high impedance state (Hi-Z) to the H level and then changed from the H level to the high impedance state (Hi-Z). In addition, the time period for which the voltage level of the data terminal SDA is set to the H level may be equal to the two physical cycles of the clock signal.

Figure 8:
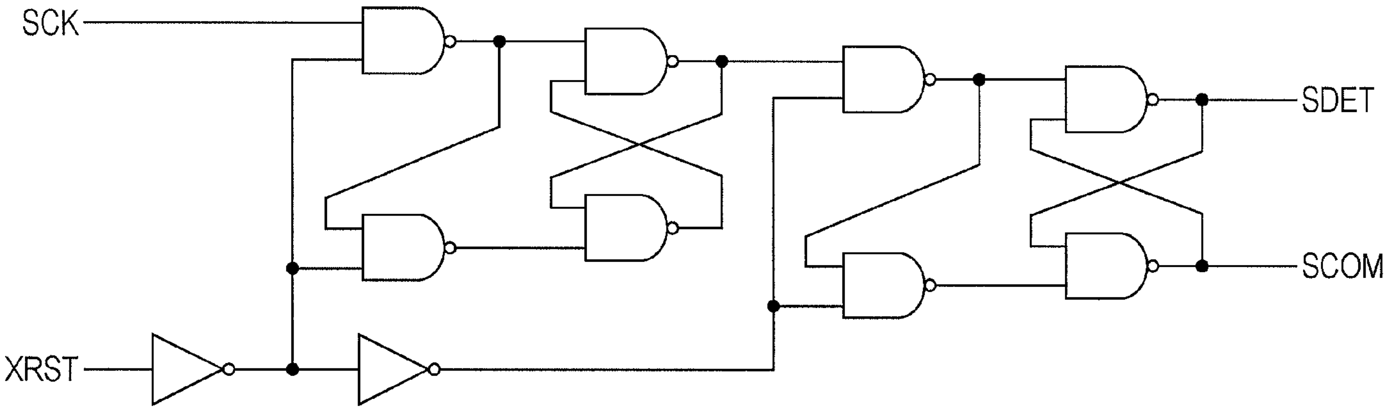
FIGS. 8A and 8B are diagrams showing an operation and configuration of a mode determining section.

FIG. 8(A) is a diagram showing operations of the mode determining section 150. The mode determining section 150 determines that the operational mode is the connection detection mode when the voltage level of the reset terminal XRST is changed from the voltage level (L level) indicating the reset state to the voltage level (H level) indicating the reset-disabled state during the time period for which the voltage level of the clock terminal SCK is the second voltage level (H level). In addition, the mode determining section 150 sets, to the active level (H level), the control signal SDET to be transmitted to the responding section 160.

On the other hand, the mode determining section 150 determines that the operational mode is the normal communication mode when the voltage level of the reset terminal XRST is changed from the voltage level (L level) indicating the reset state to the voltage level (H level) indicating the reset-disabled state during the time period for which the voltage level of the clock terminal SCK is the first voltage level (L level). In addition, the mode determining section 150 sets, to the active level (H level), the control signal SCOM to be transmitted to the storage controller 120.

FIG. 8(B) shows an example of the configuration of the mode determining section 150. In this configuration example, the mode determining section 150 is constituted by D flip flop circuits. Operations of the circuits are the same as an operation of a normal D flip flop circuit. Specifically, the voltage level of the clock terminal SCK is input by a rising edge of the voltage level of the reset terminal XRST and maintained as the output SDET, and an output obtained by inverting the output SDET is maintained as the output SCOM.

Figure 9:
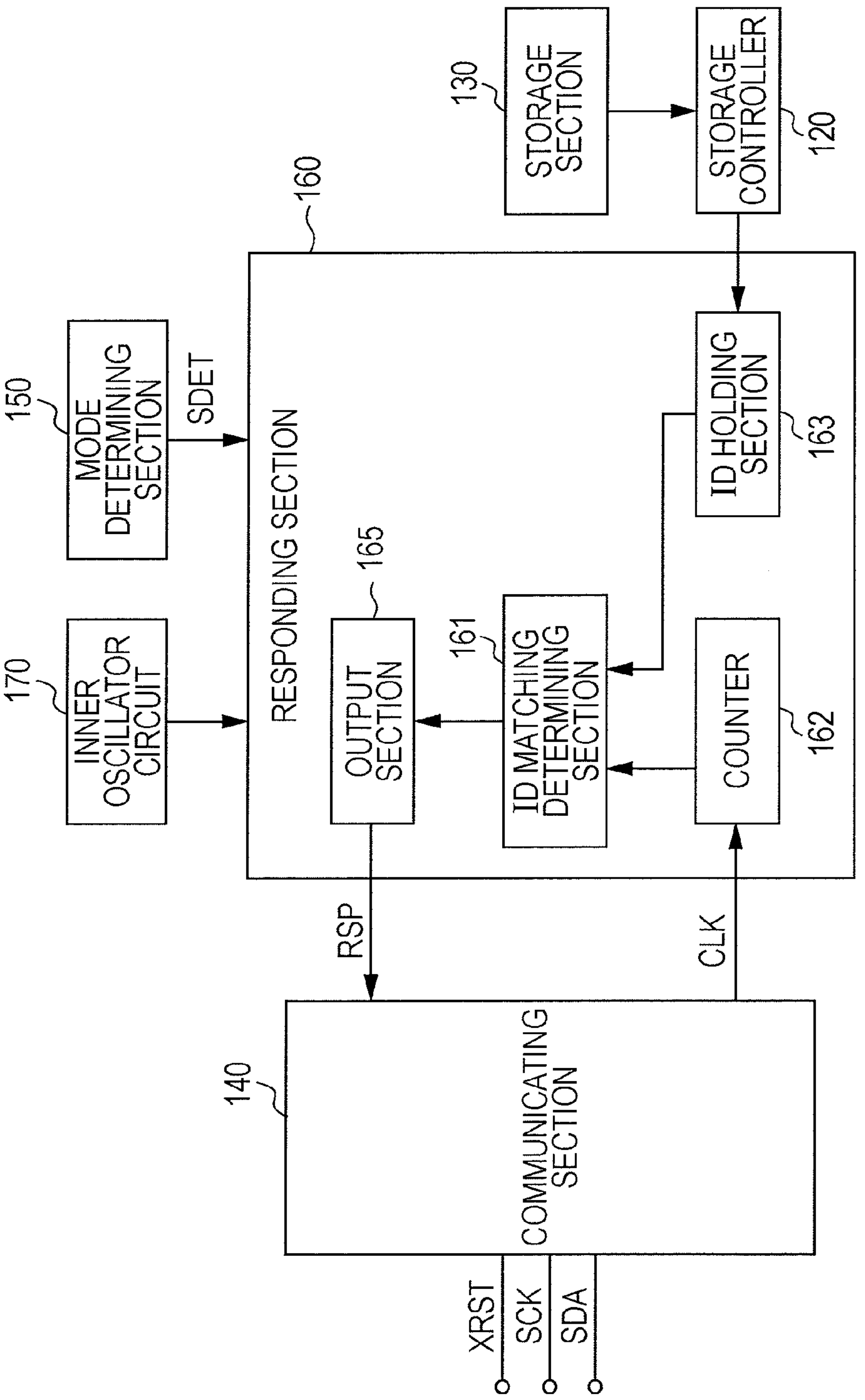
FIG. 9 is a diagram showing an example of a basis configuration of a responding section.

FIG. 9 shows a basis configuration of the responding section 160. The responding section 160 includes an ID matching determining section 161, a counter 162, an ID holding section 163 and an output section 165.

The ID matching determining section 161 (matching determining section) determines whether or not a value counted by the counter 162 matches the value of the ID information read from the storage section 130. The counter 162 performs a process of counting a clock CLK that has been input to the clock terminal SCK after the start time of the first clock cycle T1. The ID holding section 163 holds the value of the ID information read from the storage section 130 and outputs the value to the ID matching determining section 161. The output section 165 outputs, on the basis of the result of the determination made by the ID matching determining section 161, an output instruction RSP to instruct the communication section 140 to output the response signal ANS.

When the counted value matches the value of the ID information, the responding section 160 provides the instruction to output the response signal. Specifically, as shown in the timing chart of FIG. 5(A), when the mode determining section 150 determines that the operational mode is the connection detection mode (A3 of FIG. 5(A)), the mode determining section 150 sets the control signal SDET to the active level. Then, the storage controller 120 reads the value of the ID information from the storage section 130 during the ID information reading time period TRM, and the ID holding section 163 holds the value of the ID information. Next, the counter 162 starts the process of counting the clock CLK after the start time (A4 of FIG. 5(A)) of the first clock cycle T1.

Then, the ID matching determining section 161 determines whether or not the value counted by the counter 162 matches the value of the ID information. When the value counted by the counter 162 matches the value of the ID information, the output section 165 outputs the output instruction RSP to instruct the communication section 140 to output the response signal ANS. For example, as shown in FIG. 5(A), the value counted during the first clock cycle T1 is 1. Thus, the response signal ANS1 is output from the storage device that has the ID of 1. In the same manner, the value counted during the second clock cycle T2 is 2. Thus, the response signal ANS2 is output from the storage device that has the ID of 2. In this manner, the response signal ANS is output for the clock cycle corresponding to the value of the information on the ID of each of the storage devices.

In the second example (shown in FIG. 2) of the configuration of the system, it is not necessary that the storage device 100 output the response signal for the clock cycle corresponding to the information on the ID of the storage device 100 as described with reference to FIG. 7(A). Thus, when the mode determining section 150 that the operational mode is the connection detection mode, the responding section 160 outputs the output instruction RSP in order to output the response signal ANS. Therefore, the configuration of the responding section 160 can be simplified.

FIG. 10 shows an example of corresponding relationships between the ID information and the clock cycles. As shown in FIG. 10, the values of the ID information are each represented by three bits and can be used in a range of 0 to 7. However, the ID of 0 may not be used as shown in FIG. 10. The ID of 1 corresponds to the first clock cycle T1. The ID of 2 corresponds to the second clock cycle T2. In the same manner, the IDs of 3 to 7 correspond to the third to seventh clock cycles T3 to T7. However, it is not necessary to use values up to the ID of 7. For example, when the number of ink cartridges (liquid containers in the broad sense) to be actually used is 4, the IDs of 1 to 4 are used as the ID information. Specifically, the IDs of 1 to 4 can correspond to four colors (black, cyan, magenta, and yellow) of the ink cartridges, respectively, for example.

FIG. 11 shows another example of the corresponding relationships between the ID information and the clock cycles. FIG. 11 shows single-color-type liquid containers (ink cartridges) that each store a liquid (ink or the like) of a single color and an integrated liquid container (ink cartridge) that stores liquids of multiple colors.

For example, when the single-color-type liquid containers are used, the IDs of 1 to 4 can correspond to liquid containers for storing liquids of the colors (black, cyan, magenta, and yellow) as described above, and the response signals can be output for the clock cycles T1 to T4. In addition, when the integrated four-color liquid container is used, the value of the ID information can be set to 7, and the response signal can be output for the clock cycles T1 to T4. In addition, when the black single-color-type liquid container and the integrated color liquid container are used, the value of the ID information on the black single-color-type liquid container can be set to 1, the response signal can be output for the clock cycle T1, the value of the ID information on the integrated color liquid container can be set to 6, and the response signal can be output for the clock cycles T2 to T4.

As described above, in the storage device according to the present embodiment, the responding section 160 can provide the instruction to output the response signal for multiple clock cycles among the first to n-th clock cycles T1 to Tn. In addition, when the liquid container 300 according to the present embodiment stores liquids of multiple colors, it is possible to output the response signal for multiple clock cycles that correspond to the multiple colors among the first to n-th clock cycles T1 to Tn. Thus, the first to n-th clock cycles can correspond to the ink of the number n of colors. Therefore, the ID information can correspond to the clock cycles without a change in firmware of the host device regardless of whether the ink cartridge is of the single-color-type or the integrated type.

In the second example (shown in FIG. 2) of the configuration of the system, the host device can specify a storage device that outputs the response signal or is to be subjected to the detection of the connection as described above. Thus, when the liquid container 300 stores liquids of multiple colors, the storage device does not need to output multiple response signals.

3. Board and Liquid Container

Next, an example of a detailed configuration of the liquid container 300 that includes the storage device 100 according to the present embodiment is described with reference to FIG. 12. In the following example, it is assumed that the host device 400 is an ink jet type printer, the liquid container 300 is an ink cartridge, and the board 200 is a circuit board arranged in the ink cartridge. In the present embodiment, however, the host device may be another device, the liquid container may be another container, and the board may be another board. For example, the host device may be a reader/writer of a memory card, and the board may be a circuit board arranged in the memory card.

Figure 12:
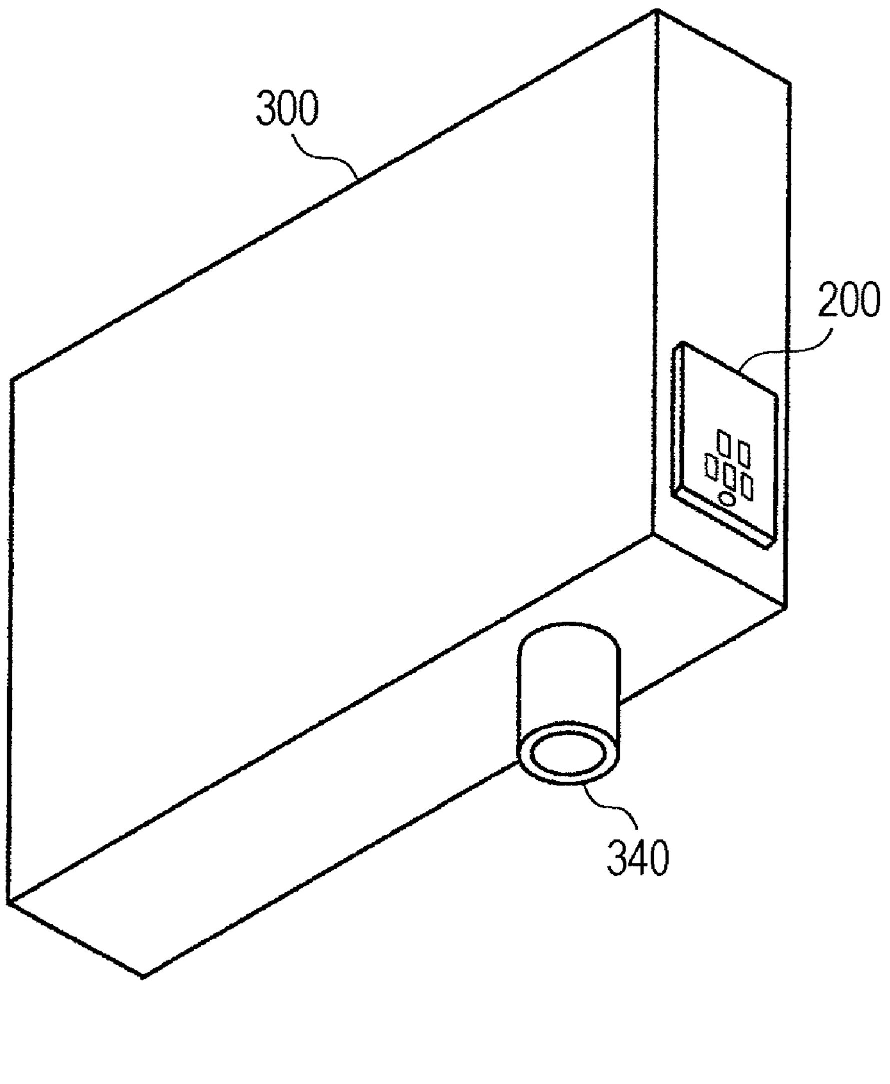
FIG. 12 is a diagram showing an example of a detailed configuration of a liquid container.

An ink chamber (not shown) for storing ink is formed in the ink cartridge 300 (liquid container in the broad sense) shown in FIG. 12. In addition, the ink cartridge 300 has an ink supply port 340 that communicates with the ink chamber. The ink supply port 340 is provided to supply ink to a printing head unit when the ink cartridge 300 is attached to the printer.

The ink cartridge 300 includes the circuit board 200 (board in the broad sense). The storage device 100 according to the present embodiment is arranged on the circuit board 200. The circuit board 200 stores data and transmits and receives data to and from the host device 400. The circuit board 200 is achieved by a printed board and arranged on the surface of the ink cartridge 300, for example. The circuit board 200 has terminals such as the second power supply terminal VDD. When the ink cartridge 300 is attached to the printer, power and data are transferred by causing those terminals to contact (electrically connect) the terminals of the printer.

Figure 13:
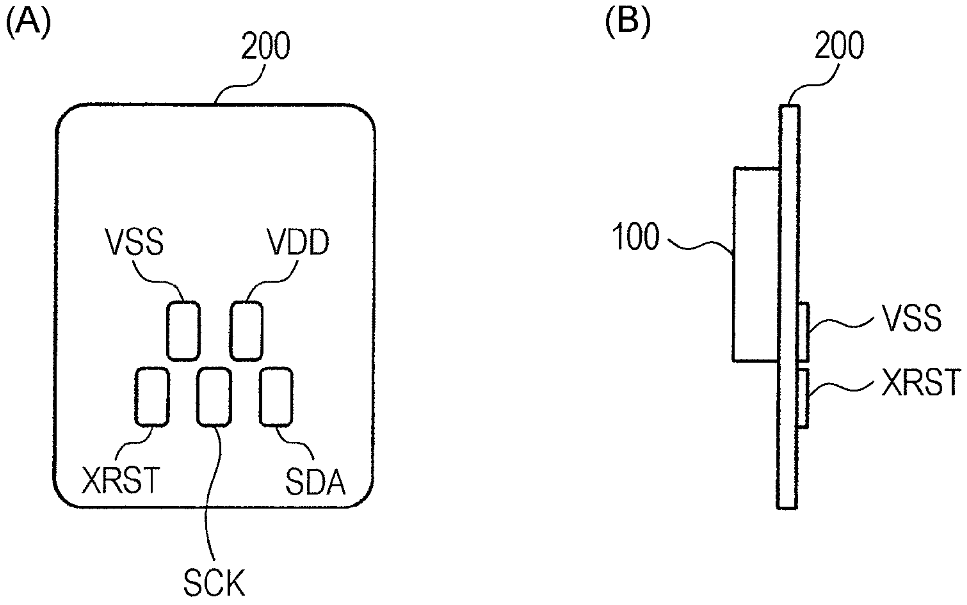
FIGS. 13(A) and 13(B) are diagram showing an example of the configuration of a circuit board.

FIGS. 13(A) and 13(B) show an example of a detailed configuration of the circuit board 200 on which the storage device 100 according to the present embodiment is arranged. As shown in FIG. 13(A), a terminal group consisting of the plurality of terminals is provided on a front surface (to be connected to the printer) of the circuit board 200. The terminal group includes the first power supply terminal VSS, the second power supply terminal VDD, the reset terminal XRST, the clock terminal SCK and the data terminal SDA. The terminals are each achieved by a metal terminal formed in a rectangular shape (substantially rectangular shape), for example. The terminals are connected to the storage device 100 through a wiring pattern layer (not shown) provided in the circuit board 200 and through holes provided in the circuit board 200.

As shown in FIG. 13(B), the storage device 100 according to the present embodiment is provided on a back surface (located on the opposite side of the surface to be connected to the printer) of the circuit board 200. The storage device 100 can be achieved by a semiconductor storage device that has a ferroelectric memory, for example. The storage device 100 has, stored therein, various types of data that is related to ink or the ink cartridge 300. For example, data such as the ID information to identify the storage device 100 and the amount of consumed ink is stored in the storage device 100. The data on the amount of the consumed ink is data that indicates a cumulative amount of ink that has been stored in the ink cartridge 300 and consumed for printing and the like. The data on the amount of the consumed ink may be replaced with information on the amount of the ink stored in ink cartridge 300. In addition, the data on the amount of the consumed ink may be replaced with information on a percentage of the amount of the consumed ink.

Figure 14:
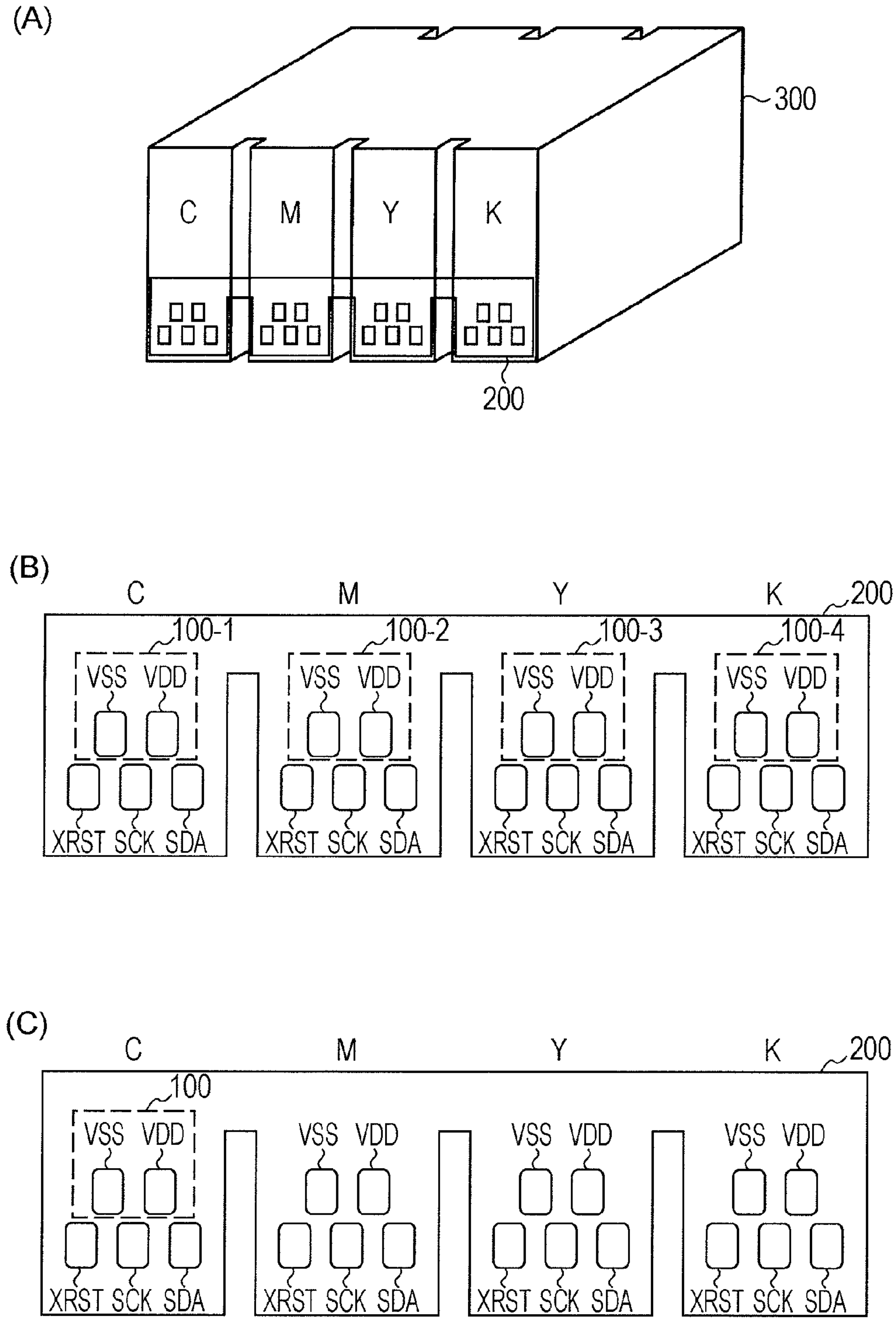
FIGS. 14(A) to 14(C) are diagrams showing examples of a detailed configuration of an integrated four-color liquid container and the board.

FIGS. 14(A) to 14(C) show examples of a detailed configuration of the integrated four-color liquid container 300 and the board 200. The integrated four-color liquid container (ink cartridge) 300 shown in FIG. 14(A) stores ink of four colors, black (K), cyan (C), magenta (M) and yellow (Y). The board 200 is a common board (board in the broad sense) that is used for the integrated four-color liquid container 300. The board 200 has four terminal groups corresponding to the four colors (C, M, Y and K). The terminal groups each include the first power supply terminal VSS, the second power supply terminal VDD, the reset terminal XRST, the clock terminal SCK and the data terminal SDA.

FIG. 14(B) shows a first example of the configuration of the common board (board) 200. The board 200 with the configuration according to the first example includes the first to fourth storage devices 100-1 to 100-4. The four storage devices correspond to the four colors (C, M, Y and K). For example, the first storage device 100-1 has ID information corresponding to the liquid color, cyan (C) and outputs the response signal for a clock cycle corresponding to the liquid color, cyan (C) in the connection detection mode. Since the storage devices are provided on the back surface (located on the opposite side of the surface on which the terminals are provided) of the common board 200, the storage devices are indicated by dashed lines.

FIG. 14(C) shows a second example of the configuration of the common board (board). The common board 200 with the configuration according to the second example includes a single storage device 100. The single storage device has the ID of 7 (shown in FIG. 11) as the ID information, for example. The single storage device outputs the response signal for four clock cycles corresponding to the four liquid colors (C, M, Y and K). In this case, since the single storage device can output the response signal corresponding to the four liquid colors, a reduction in a production cost and the like can be achieved.

In FIG. 14(C), the storage device 100 is arranged at a position corresponding to the liquid color, cyan (C). However, the storage device 100 may be arranged at a position corresponding to another liquid color. For example, the storage device 100 may be arranged at a position corresponding to the magenta (M). In addition, the storage device 100 may be arranged at a position corresponding to the yellow (Y).

In FIG. 14(C), the terminal groups that correspond to the liquid colors (magenta (M), yellow (Y) and black (K)) for which a storage device is not arranged may be or may not be electrically connected to the terminal group corresponding to the cyan (C) for which the storage device is arranged. Specifically, the reset terminal XRST that corresponds to the magenta (M) may be or may not be electrically connected to the reset terminal XRST corresponding to the cyan (C).

In addition, the terminal groups that correspond to the liquid colors (magenta (M), yellow (Y) and black (K)) for which a storage device is not arranged may not be provided.

The number of storage devices arranged on the common board (board) 200 may be 2 or 3. For example, the first storage device that corresponds to the black (K), and the second storage device that corresponds to the other three colors, may be provided. In addition, the first storage device that corresponds to the black (K), the second storage device that corresponds to the cyan (C), and the third storage device that corresponds to the other two colors, may be provided.

4. Host Device

Figure 15:
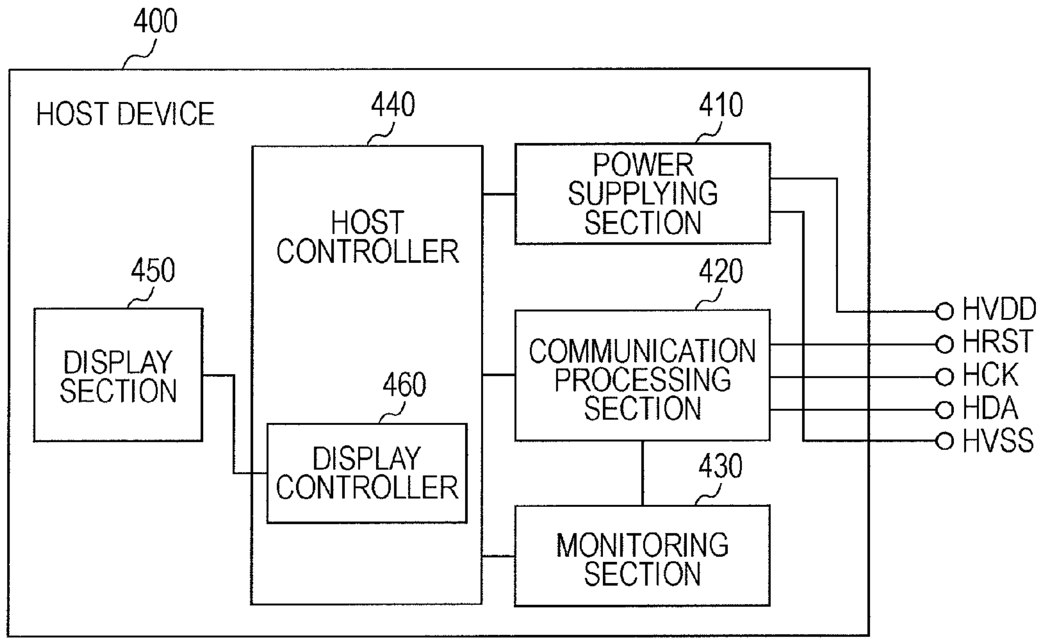
FIG. 15 is a diagram showing an example of a basic configuration of a host device.

FIG. 15 shows an example of a basic configuration of the host device 400 according to the present embodiment. The host device 400 is a printer body, for example. The host device 400 includes a power supplying section 410, a communication processing section 420, a monitoring section 430, a host controller 440, a display section 450 and a display controller 460. In addition, the host device 400 includes the first to k-th (k is an integer of two or more) host-side terminals. Specifically, the host device 400 includes the host-side reset terminal HRST, the host-side clock terminal HCK, the host-side data terminal HDA, the first host-side power supply terminal HVSS and the second host-side power supply terminal HVDD, for example.

The power supplying section 410 supplies power to the first to n-th storage devices 100-1 to **100-*n*. The communication processing section 420 communicates with the first to n-th storage devices 100-1 to 100-*n*** through the first to k-th host-side terminals such as the host-side reset terminal HRST, the host-side clock terminal HCK and the host-side data terminal HDA.

In the second example of the configuration of the system shown in FIG. 2, the host device 400 includes the first to n-th host-side reset terminals HRST1 to HRSTn as the host-side reset terminals.

The monitoring section 430 monitors whether or not the response signals are output from the first to n-th storage devices 100-1 to **100-*n* for the clock cycles T1 to Tn of the clock supplied to the first to n-th storage devices 100-1 to 100-*n***.

In the second example of the configuration of the system shown in FIG. 2, the monitoring section 430 monitors whether or not the response signal is output from a storage device that is to be subjected to the detection of the connection among the first to n-th storage devices 100-1 to **100-*n***.

The host controller 440 performs a process of controlling the power supplying section 410, the communication processing section 420, the monitoring section 430 and the display section 450.

The display section 450 is a liquid crystal display (LCD) or the like and displays an operation screen of the host device 400 (printer), an operational state of the host device 400, an error message and the like. In the connection detection mode, the display section 450 displays the result of the detection of the connection on the basis of the monitoring result of the monitoring section 430.

The display controller 460 controls the display section 450 so that the result of the detection of the connection is displayed by the display section 450. The display controller 460 is achieved by a known display controller.

Figure 16:
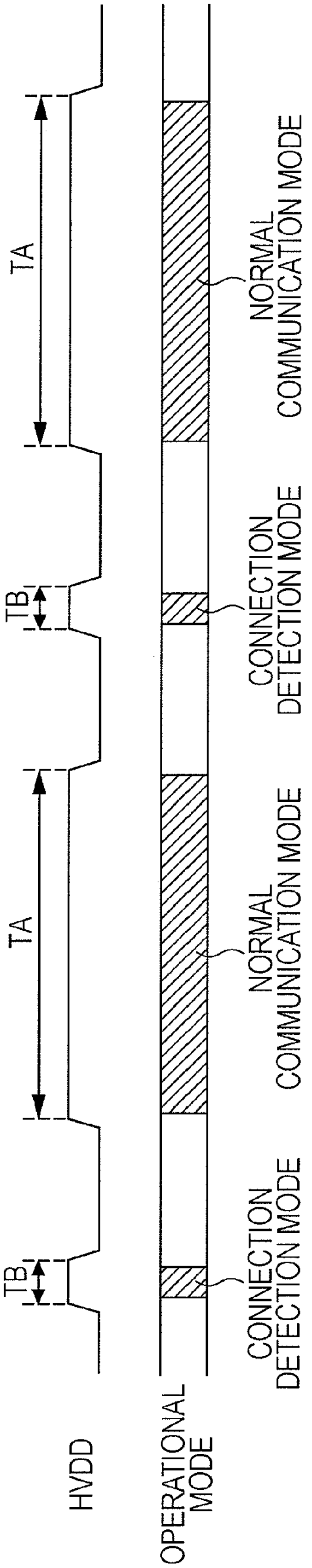
FIG. 16 is a diagram showing time periods for supplying power in the normal communication mode and the connection detection mode.

FIG. 16 is a diagram showing a time period for supplying power in the normal communication mode and a time period for supplying power in the connection detection mode. When the time period for supplying power in the normal communication mode is indicated by TA and the time period for supplying power in the connection detection mode is indicated by TB, the power supplying section 410 supplies the power so that TA>TB. In addition, the time period for supplying power in the connection detection mode may be provided between the time period for supplying power in the normal communication mode and the next time period for supplying power in the normal communication mode. A plurality of the time periods for supplying power in the connection detection mode may be sequentially provided, although this is not shown.

Thus, the time period for supplying power in the connection detection mode can be provided during a short time period between a single time period for supplying power in the normal communication mode and the next time period for supplying power in the normal communication mode. It is, therefore, possible to detect the connection of the ink cartridge without a problem with normal data communication. As a result, it is possible to improve reliability of the printer system.

In addition, since it is possible to detect the connection of the ink cartridge for a short time, whether or not the ink cartridge is attached can by displayed by the display section 450 in real time. As a result, it is possible to prevent an error from occurring when a user replaces the ink cartridge, and it is possible to improve the operability.

As a method according to a comparative example of the present embodiment, a method for detecting a communication timeout error in the normal communication mode (normal operational mode) can be considered. In this method, however, since the connection using the bus is provided, it takes some time before the timeout error occurs. Thus, there is a problem that the detection of the connection is performed for a long time. Therefore, it is highly likely that an error occurs during communication. When an error occurs, it may be determined that the ink cartridge is not attached although the ink cartridge is actually attached.

In the present embodiment, the connection detection mode that is different from the normal communication mode is provided. In the connection detection mode, the detection of the connections can be completed during the number n of clock cycles as shown in FIGS. 5(A) and 6(A), for example. Thus, as shown in FIG. 16, even when the connection detection mode that is different from the normal communication mode is provided, the time period TB for supplying power in the connection detection mode can be set to a time length that is sufficiently smaller than the time period TA for supplying power in the normal communication mode. Therefore, the short time period for supplying power in the connection detection mode can be set between a single time period for supplying power in the normal communication mode and the next time period for supplying power in the normal communication mode, and the detection of the connection can be performed for the short time period for supplying power in the connection detection mode. As a result, it is not necessary to perform the detection of the connection in the normal communication mode. It is possible to prevent a bandwidth for the normal communication mode from being limited since the connection detection mode is provided. In addition, since the time period that is necessary for the detection of the connection can be reduced, it is possible to display the detection result in real time and suppress the occurrence of an error during the detection.

Although the present embodiment is described above in detail, it can be easily understood by those skilled in the art that various modifications can be made without departing in substance from the new matters and effects of the invention. Therefore, all of those modifications are deemed included in the scope of the invention. For example, the terms (L level, H level) cited at least once with the different terms (first voltage level, second voltage level) having a broader meaning or the same meaning in the specification or the drawings may be replaced with the different terms anywhere in the specification or the drawings. In addition, the configurations and operations of the storage devices, the board, the liquid containers, the host device and the system are not limited to the present embodiment and can be variously modified.

[Reference Signs List]

100 Storage device, 110 Controller, 120 Storage controller, 130 Storage section, 140 Communicating section, 150 Mode determining section, 160 Responding section, 161 ID matching determining section, 162 Counter, 163 ID holding section, 165 Output section, 170 Inner oscillator circuit, 180 Power-on reset circuit, 200 Board, 300 Liquid container, 340 Ink supply port, 400 Host device, 410 Power supplying section, 420 Communication processing section, 430 Monitoring section, 440 Host controller, 450 Display section, 460 Display controller, SCK Clock terminal, SDA Data terminal, SCOM, SDET Control signal, VDD Second power supply terminal, VSS first power supply terminal, XRST Reset terminal

The invention claimed is:

1. A storage device comprising:

a storage section;

a storage controller that controls access to the storage section;

a controller that performs a communication process with a host device;

a data terminal;

a reset terminal; and a clock terminal, wherein the host device is electrically connected to first to n-th (n is an integer of two or more) storage devices including the storage device through a bus, wherein a reset signal that is output from the host device is input to the reset terminal through the bus, wherein the controller determines that an operational mode is a normal communication mode when a voltage level of the reset terminal is changed from a voltage level indicating a reset state to a voltage level indicating a reset-disabled state during a time period for which a voltage level of the clock terminal is a first voltage level, wherein the controller determines that the operational mode is a connection detection mode when the voltage level of the reset terminal is changed from the voltage level indicating the reset state to the voltage level indicating the reset-disabled state during a time period for which the voltage level of the clock terminal is a second voltage level, and wherein a clock that includes first to n-th (n is an integer of two or more) clock cycles is input to the clock terminal, and wherein when the controller determines that the operational mode is the connection detection mode, the controller outputs a response signal to the host device through the data terminal for an m-th (m is at least one of integers satisfying $1 \leqq m \leqq n$) clock cycle among the first to n-th clock cycles after the voltage level of the clock terminal is changed from the second voltage level to the first voltage level, the response signal indicating that the storage device is connected, the m-th clock cycle corresponding to information on the ID of the storage device.

2. The storage device according to claim 1, wherein a reset signal that corresponds to the storage device among first to n-th (n is an integer of two or more) reset signals output from the host device is input to the reset terminal.

3. The storage device according to claim 1, wherein when the controller determines that the operational mode is the normal communication mode, the controller receives information output from the host device through the data terminal in accordance with a clock after the voltage level of the clock terminal is changed from the first voltage level to the second voltage level.

4. The storage device according to claim 3, wherein the controller receives a command as the infoimation output from the host device, analyzes the received command, and receives data from the host device on the basis of the result of the analysis or transmits data to the host device on the basis of the result of the analysis.

5. The storage device according to claim 1, wherein when the voltage level of the reset terminal is changed from the voltage level indicating the reset-disabled state to the voltage level indicating the reset state after the controller determines that the operational mode is the connection detection mode, the controller performs a process of terminating the connection detection mode.

6. A board comprising the storage device according to claim 1.

7. A liquid container comprising the storage device according to claim 1.

8. A system comprising:

the storage device according to claim 1; and the host device.

* * * * *